Sept. 1, 1931.    E. E. SLICK    1,820,951
DISPENSING APPARATUS
Filed March 13, 1929
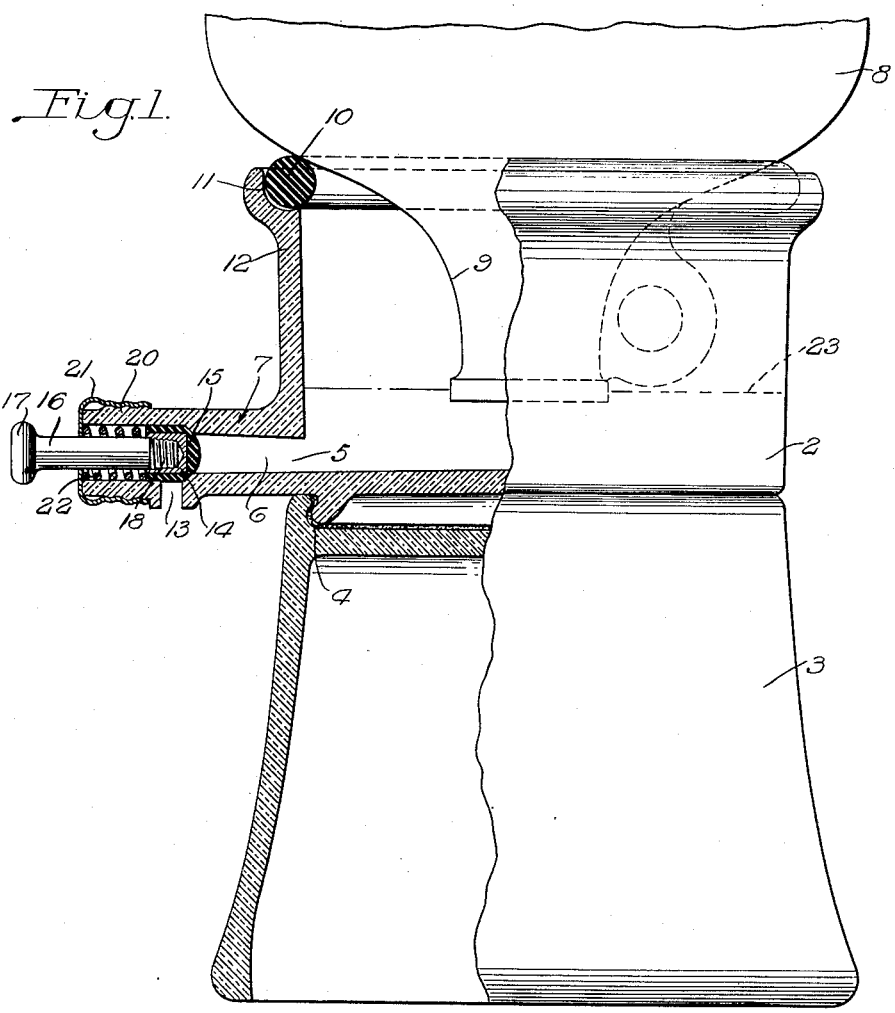
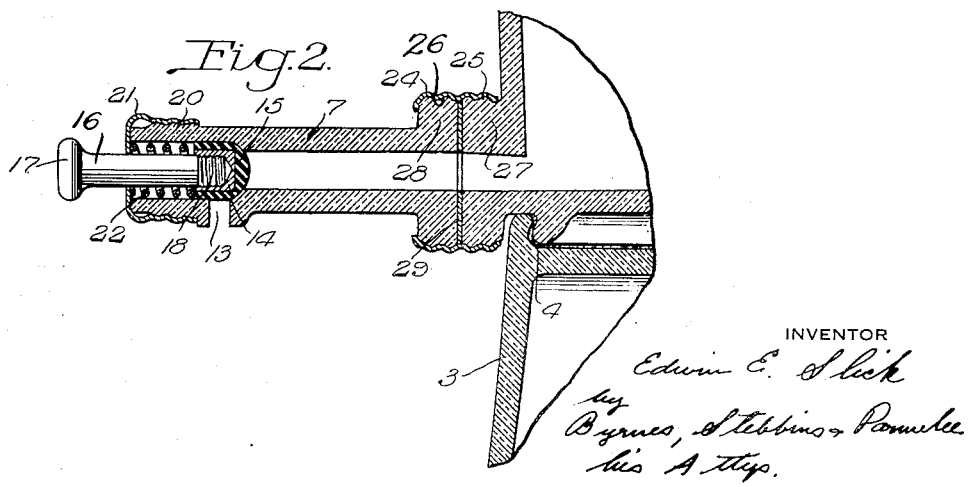
INVENTOR
Edwin E. Slick
by Byrnes, Stebbins & Parmelee
his Attys.

Patented Sept. 1, 1931

1,820,951

UNITED STATES PATENT OFFICE

EDWIN E. SLICK, OF PITTSBURGH, PENNSYLVANIA

DISPENSING APPARATUS

Application filed March 13, 1929. Serial No. 346,614.

This invention relates generally to dispensing apparatus, and more particularly to dispensing apparatus of vitreous material and to vitreous spigots adapted for cooperation with vitreous liquid containers.

In dispensing apparatus such as is commonly employed in soda fountains for dispensing liquids, for example, fruit juices, the liquid ordinarily is dispensed from a glass container. The spigot for controlling the flow of liquid from the container usually is made out of metal. The use of metal spigots is often disadvantageous in that the liquid may tend to corrode the spigot. The spigots usually are of rather a complicated construction containing many parts which become dirty in use and require frequent cleaning. The construction of the spigot commonly used is such that it is difficult to disassemble it in order to perform the cleaning operation.

My invention provides a dispensing apparatus in which the spigot is made of a vitreous material. The construction of my apparatus is relatively simple and the parts are so arranged that they may be easily disassembled for cleaning.

In the accompanying drawings which illustrate two present preferred embodiments of my invention, Figure 1 is a side elevation of a dispensing apparatus, parts being shown in section, and Figure 2 illustrates a modification in which the spigot and liquid container are connected by a coupling.

Referring to the drawings, there is shown a liquid container 2 made of vitreous material. The container is supported on a base 3 and is cemented thereto as indicated at 4. The container 2 has an outlet opening 5 cooperating with an inlet opening 6 of a spigot indicated generally by the numeral 7. The liquid to be dispensed is supplied to the container from a bottle 8 having its neck 9 extending into the container. The bottle is supported on a rubber ring 10 arranged in a groove 11 provided at the upper edge of the side walls 12 of the container.

The spigot 7 is made of vitreous material and has an inlet opening 6 cooperating with the outlet opening 5 of the container 2. As indicated in Figure 1, the spigot is fused to the container. If desired, however, the container and spigot may be formed in one piece during the molding operation. An outlet opening 13 for the spigot is controlled by a rubber valve 15. The valve is actuated through a valve stem 16 and valve handle 17. The inner end 18 of the valve stem is threaded into a metal bushing 14 secured to the inside of the valve 15. The outer end 20 of the spigot is provided with a metal cap 21 threaded thereon. A spring 22 surrounds the stem 16 and has its ends abutting the cap 21 and the bushing 14. The spring normally maintains the valve in the position indicated in Figure 1 to close the spigot outlet 13.

When it is desired to dispense liquid from the container 2 the valve stem 16 and handle 17 are pulled outwardly to uncover the outlet opening 13. Upon releasing the handle 17 the spring 22 forces the valve 15 inwardly to cover the outlet opening. The liquid in the container 2 is maintained substantially at the level indicated at 23. If the liquid falls slightly below this level, air is admitted through the neck 9 of the bottle 8 to displace liquid contained in the bottle and thereby maintain the level of the liquid in the container 2.

In the modification shown in Figure 2, the spigot, instead of being fused to the container as in the embodiment hereinabove described, is connected to the container by a coupling 24. The outer surfaces 25 and 26 of the collars 27 and 28 provided on the container and the spigot respectively are threaded to cooperate with the coupling 24. A packing ring 29 is arranged between the contacting faces of the container and the spigot in order to prevent leakage of the liquid.

I have illustrated and described two present preferred embodiments of my invention. It is to be understood, however, that the invention may be otherwise embodied within the scope of the following claims.

I claim:

1. A spigot of vitreous material having an outlet opening therein, a rubber valve cooperating with the opening, the valve having a vitreous valve stem threaded in a bushing secured to the valve, the outer end of the spigot having a cap threaded thereon, and a spring surrounding the stem and having its ends abutting the cap and the bushing.

2. A spigot of vitreous material having an outlet opening therein, a valve consisting of a metallic bushing having a casing of resilient material, said bushing being internally threaded, a vitreous valve stem having one end screwed into said bushing, and a spring tending to cause the valve to close the outlet opening.

3. A spigot of vitreous material having an outlet opening therein, a valve consisting of a metallic bushing having a casing of resilient material, said bushing being internally threaded, a vitreous valve stem having its inner end screwed into said bushing, the outer end of the spigot being externally threaded, a cap on the threaded outer end of the spigot, and a spring surrounding the valve stem and having its ends abutting the cap and valve.

4. A spigot of vitreous material having a collar at its inner end and an outlet opening intermediate its ends, the collar being externally threaded, a coupling screwed on the collar and adapted for connection with the outlet of a dispensing apparatus, the outer end of the spigot being externally threaded, a valve consisting of a metallic bushing having a casing of resilient material, said bushing being internally threaded, a vitreous valve stem having its inner end screwed into said bushing, a cap on the threaded outer end of the spigot, and a spring surrounding the valve stem and having its ends abutting the cap and valve.

In testimony whereof I have hereunto set my hand.

EDWIN E. SLICK.